INVENTOR.
PETER L. SWANNEY
BY
Barbee & Latta
ATTORNEYS

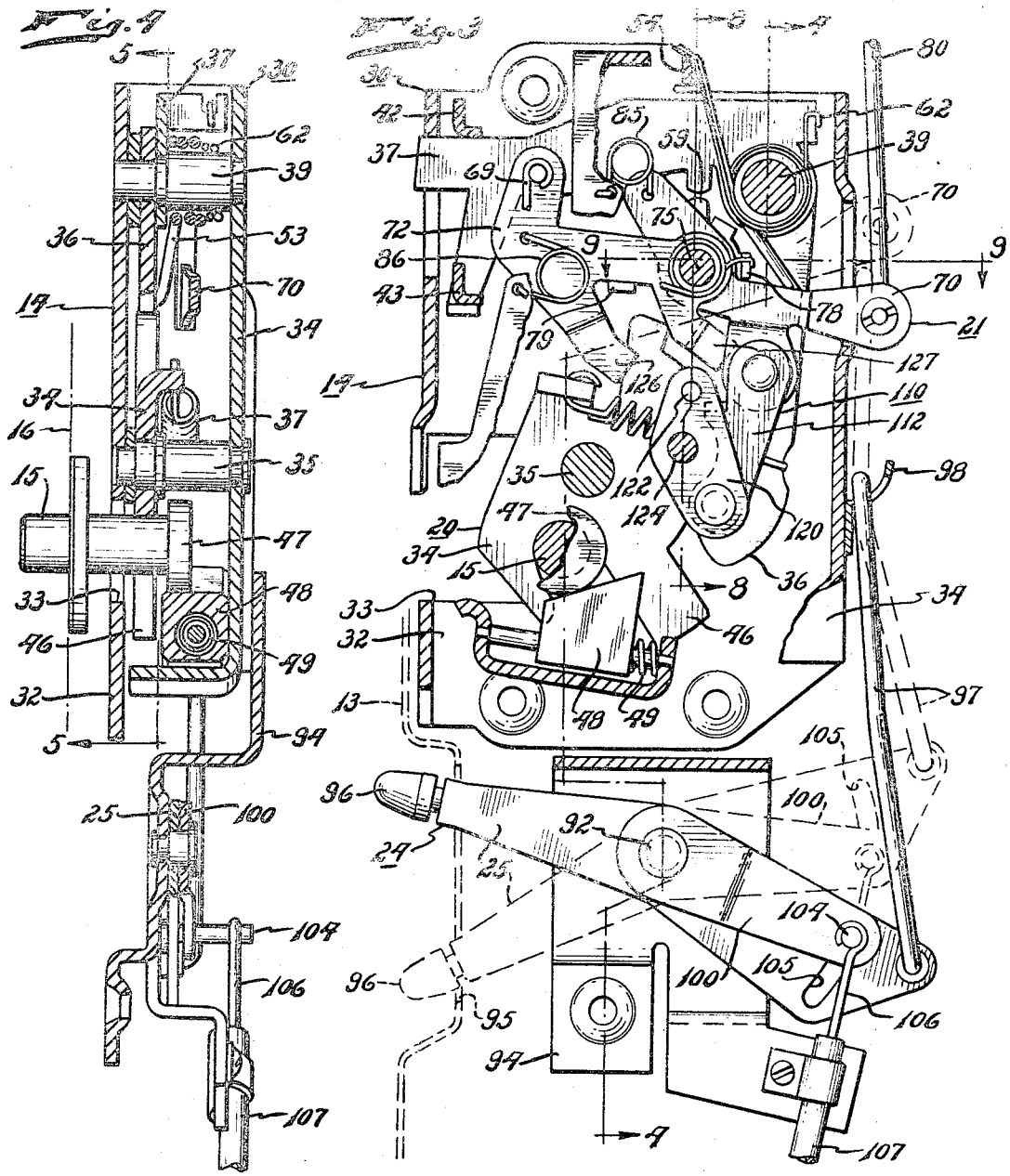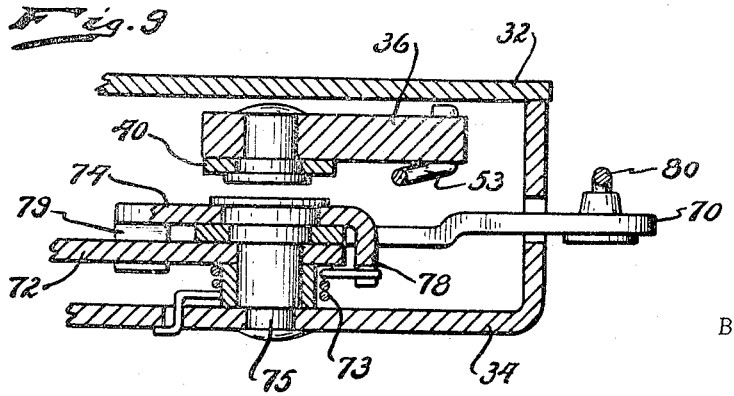

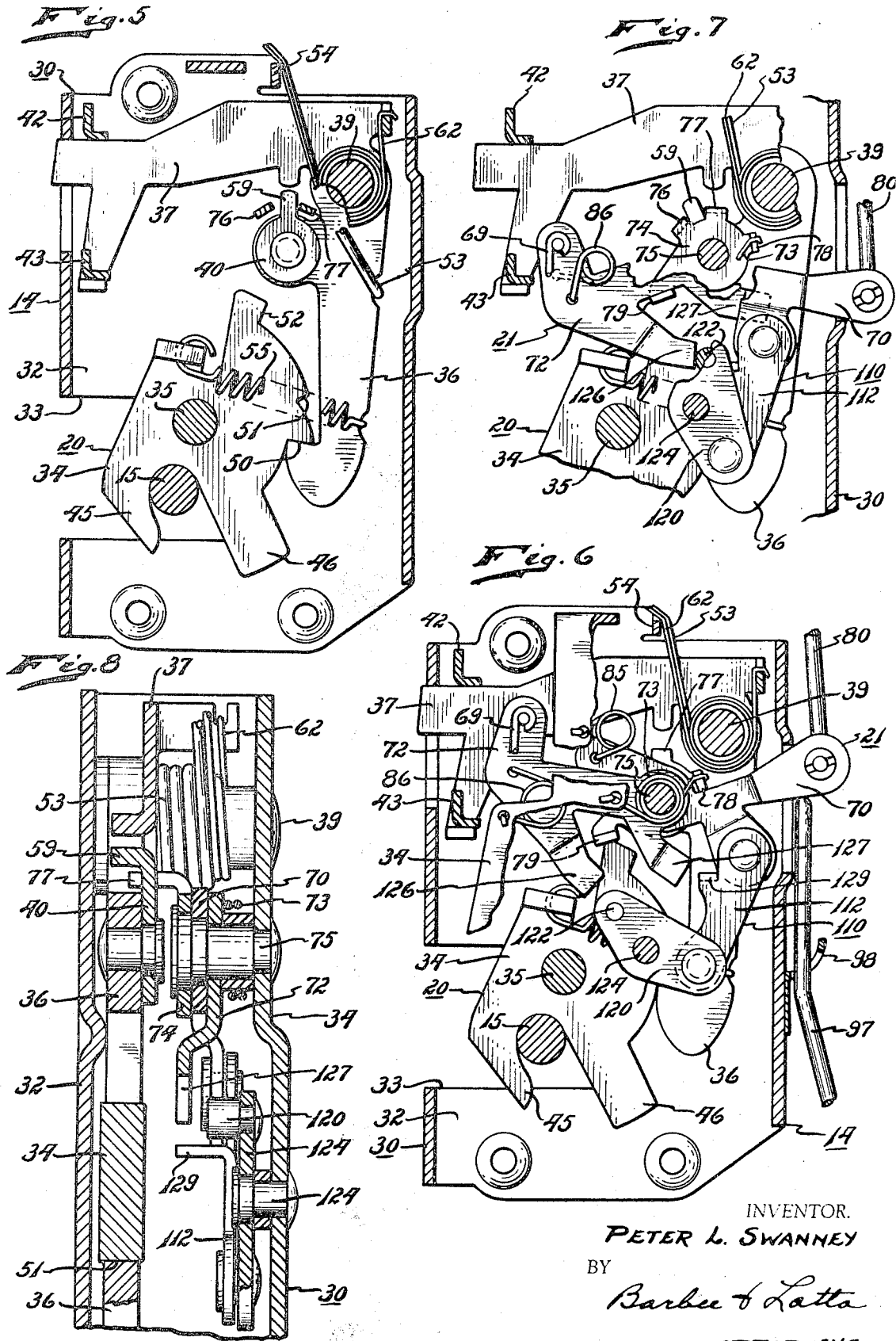

United States Patent Office 3,520,159
Patented July 14, 1970

3,520,159
ANTITHEFT LOCKING ARRANGEMENT FOR VEHICLES

Peter L. Swanney, Southfield, Mich., assignor to American Motors Corporation, Kenosha, Wis., a corporation of Maryland
Filed Dec. 16, 1968, Ser. No. 784,105
Int. Cl. E05b *63/14, 65/32;* E05c *3/26*
U.S. Cl. 70—241                                    15 Claims

ABSTRACT OF THE DISCLOSURE

An antitheft locking arrangement for motor vehicles including a locking mechanism for a door latch settable by either inside or outside manually operated controls and at least the outside being key operated. The locking mechanism may also be preset into lock position by a manually operated control concealed and made inaccessible upon the closure and locking of the door. The concealed control also actuates a hood locking mechanism and a master switch incorporated in the ignition system. The latch locking mechanism has a dual independently actuated mechanism of which one is made inoperative or actuated to inoperative unlock position upon the setting of the other by either the concealed or the key operated control.

BACKGROUND OF THE INVENTION

Field of the invention

This invention pertains to door locks for motor vehicles and more particularly to an improved door locking mechanism selectively operable from conventional manually operated controls and being also presettable into lock position by a concealable control which simultaneously actuates other locking arrangements about the vehicle.

Description of the prior art

The conventional door lock for a vehicle includes a latch adapted to engage a keeper or striker mounted on a pillar of the vehicle and extended therefrom. The latch is lockable by use of either and inside or outside door mounted control of which one is key operated. Generally it is an option as to which control is to be operated to lock or unlock the latch. The outside lock control is preferably key operated while the inside takes different forms such as a push button, a lever or some form of manually operated handle control. The defect of these arrangements from the aspect of preventing theft of the vehicle allows the by-passing of the outside key lock to encourage gaining access to the inner lock control as by either prying open or breaking the door's window.

Further, the known latch lock arrangements do not lend themselves to be coordinated with other locking arrangements about the vehicle through a coordinated control setting.

SUMMARY

Applicant's invention pertains to a locking arrangement for a vehicle door and more specifically to a new and improved locking mechanism for a door latch. Though it will be apparent that the locking mechanism is adapted to other vehicle door latches it is particularly adapted to replace that shown and described with a door latch as shown and described in U.S. Pat. No. 3,400,962 issued to Jack E. Martens and assigned to American Motors Corporation, the assignee of the present application.

The locking mechanism includes a pair of operative levers arranged to independently rotate a member to operatively set the door latch in lock or unlock position. The levers are independently actuatable, one being operative through a door controller on the inside of the door and the other being operative by either a controller concealed by the closure of the door or by a key operated controller carried on the outside of the door. The concealable controller includes a manually actuated lever carried by the door to be concealed thereby upon its closure. The lever is operatively connected to preset the lock mechanism into lock only and simultaneously effect a locking of a hood latching arrangement and the opening of a master switch in the vehicle's ignition circuit.

The locking mechanism is further arranged to permit only key unlockment upon the locking being made either by key or by presetting the concealed lever.

It is an object of the present invention to provide a new and improved locking arrangement for a vehicle.

Another object of the present invention is to provide for a vehicle door latch with a new and improved locking arrangement.

A further object of the present invention is to provide a locking mechanism for a vehicle door latch which upon being set in lock position for outside key unlocking will disable the alternate inside door control for unlocking and unlatching the door.

A still further object of the present invention is to provide a vehicle with a coordinated locking arrangement, in the locking of the vehicle's hood, opening a master switch to disable the ignition system and preset the door lock for the locking of the door which upon closure conceals to make inaccessible the operated controller to require a key operation to unlock and to open the door for access thereto.

BRIEF DESCRIPTION OF THE DRAWINGS

FIG. 3 is a plan view of the door latch and lock assembly with the casing broken away and parts shown in section;

FIG. 4 is a sectional view taken along line 4—4 of FIG. 3;

FIG. 5 is a plan view taken along line 5—5 of FIG. 4 of the latch arrangement;

FIG. 6 is a plan view of the lock assembly in lock position set from either the door's outside key lock or the concealed control lever;

FIG. 7 is a plan view of the lock assembly in lock position set from an inside door control and having parts broken away and parts shown in section;

FIG. 8 is a fragmentary enlarged sectional view taken along line 8—8 of FIG. 3; and FIG. 9 is a fragmentary enlarged sectional view taken along line 9—9 of FIG. 3.

DESCRIPTION OF THE PREFERRED EMBODIMENT

Figure 1:
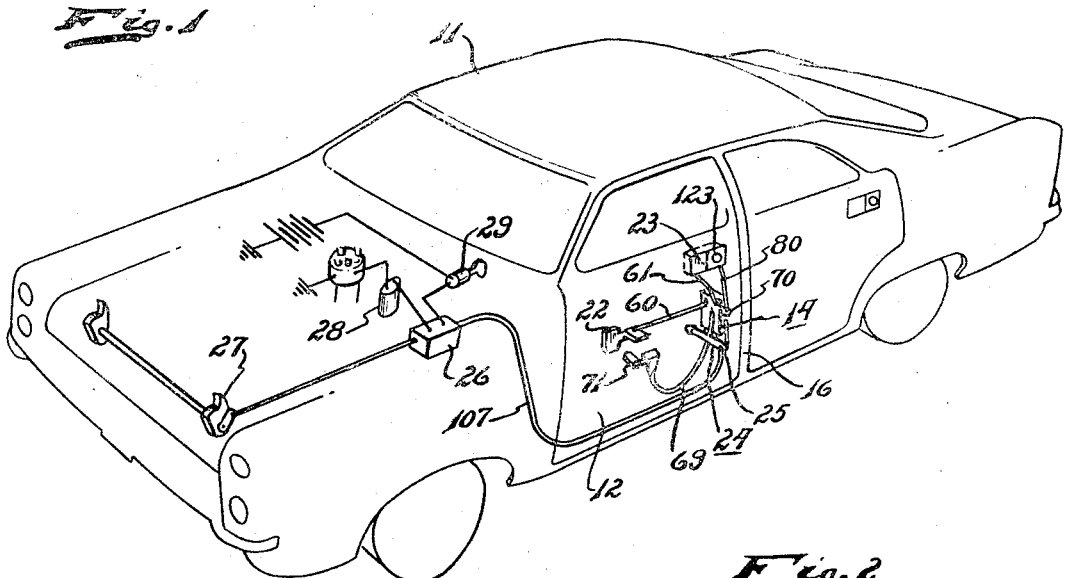
FIG. 1 is a perspective view in phantom of a vehicle embodying the antitheft locking arrangement with door and hood locking and ignition circuit control.
Figure 2:
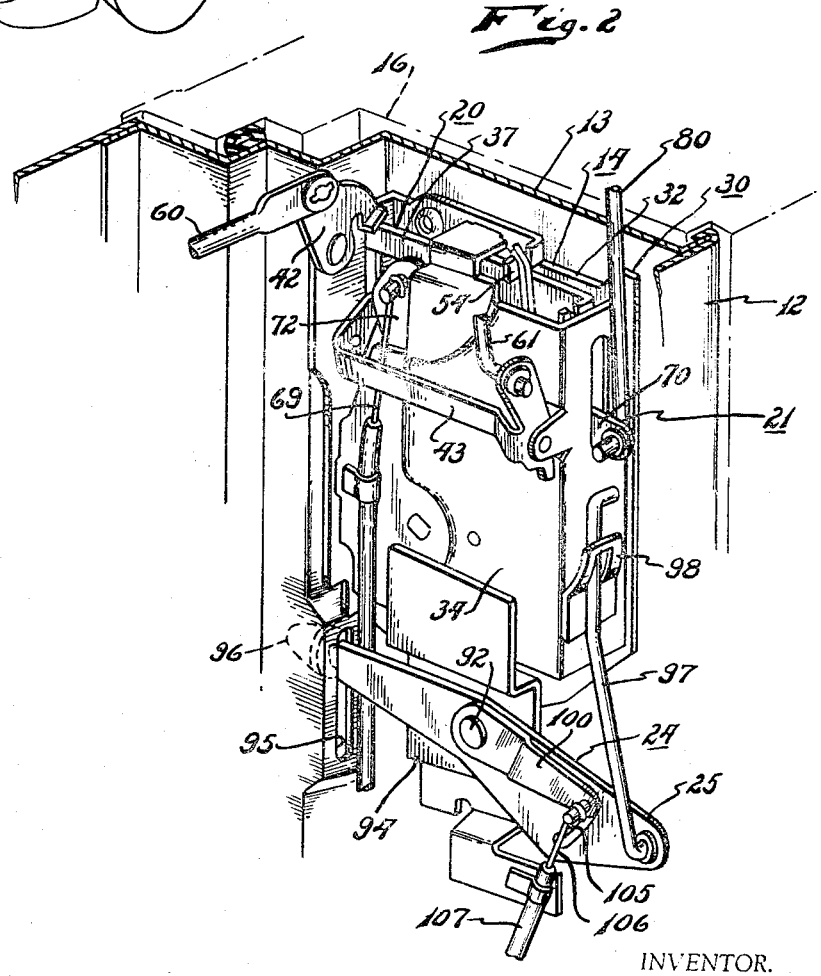
FIG. 2 is an enlarged perspective view of the door latch and lock assembly and concealed lever control illustrated in a cut-away view of a vehicle door.

Shown in the drawings is a vehicle, indicated in general by numeral 11, having a door 12 hingedly mounted in a conventional manner. Mounted for carry within the body of the door upon the end wall 13 of the door is my antitheft locking arrangement 14 incorporated with a door latch adapted to engage a striker 15 to latch and lock the door 12. The striker 15 is mounted in a conventional manner to a pillar 16 of the vehicle body.

The antitheft arrangement 14 includes a latch assembly 20, a latch lock assembly 21, inside handle control assembly 22, outside handle control assembly 23, the connections therebetween and a concealed control arrangement 24. The concealed control arrangement 24 includes a concealable lever 25 being manually operable to preset the latch locking assembly 21 in lock position, to actuate a master switch 26 incorporated in the vehicle's ignition system 28 and control the locking and unlocking of a hood latching arrangement 27.

The master switch 26 and the hood latching arrangement 27 are not shown in detail as they form no particular part of the present invention as any well known arrangement may be used. The master switch 26 is preferably wired into the ignition circuit 28 to be in series circuit with a conventional key operated ignition switch 29.

The door handle control assemblies 22, 23 are preferably as shown and described in U.S. Letters Patent 3,400,962, issued to Jack E. Martens and assigned to American Motors Corporation. Each assembly includes a latch control handle and an operative lock setting control. On the inside of the door the lock controller is preferably a lever arm while on the outside of the door it is a key operated lock 123. It will be readily apparent that if desired other well known control assemblies or arrangements may be used.

The door latch assembly 20 and the latch lock assembly are enclosed within a suitable case or casing 30. The case 30 is secured by suitable screws, bolts or the like to the end wall 13 of the door 12. The case is constructed with a base or rear wall 32 and a cover or front wall 34 suitably secured together in spaced apart relation. The base wall 32 is formed with an opening 33 for the entrance of the striker 15.

The latch assembly 20, best shown in FIGS. 4 and 5, comprise a rotor 34 rotatably mounted on a pin 35, a pawl 36, a contactor 37, a free wheeling member 40 journaled to and carried by the pawl 36 and pivotly mounted lever arms 42, 43. The pawl 36 and the contactor 37 are rotatably mounted for independent movement on a pin 39. The pins 35 and 39 are fixedly secured into and extend between the walls 31 and 32.

The rotor 34 is of the forked variety having a pair of tines 45, 46 for receiving therebetween he striker 15. The striker 15 is provided with a collar 47 serving to inhibit longitudinal separation of the striker from the rotor. A wedge 48 is movably mounted to the casing and is biased by a spring 49 to engage the striker to more firmly effect its securement with the rotor to minimize and eliminate door rattling.

The rotor 34, engaged by the pawl 36, is provided with a detent 50 for a fully latched position, a detent 51 for a partially latched safety position and a stop 52. A spring 53 biases the pawl into engagement with the detents and stops. The spring 53 is coiled about the axis of pin 39 having one end engaging the pawl and the other end tensioned against an abutment 54 formed on the base plate 32. The rotor 34 is urged to unlatched position by a coiled spring 55 of which one end is affixed to the rotor and the other to the pawl.

The contactor 37 is adapted to move the pawl 36 through engagement with the free wheeling member 40. The member 40 is formed with a finger 59 adapted to be engaged by the contactor 37. Movement to the contactor 37 is effected by movement of lever 42 or 43. The lever 42 is connected by a link arrangement 60 to an inside door handle in assembly 22 and the lever 43 by a link arrangement 61 to the outside door handle in assembly 23. A manual operation of either handle will pivotally move the contactor 37 to engage and move the member 40 sufficiently to carry the pawl 36 out of detent engagement to permit the spring 55 to rotate the rotor until stop 52 strikes pawl 36. In this position the striker may separate from the rotor to pass outwardly through the opening 33.

Release of the door handle will release to allow the contactor 37 to move away from the member 40. This movement of the contactor is effected by a spring 62 coiled about the axis pin 39 having one end secured to the wall 34 and the other being tensioned against the contactor.

To lock and prevent an unlatching of the door the member 40 is rotated by my improved lock mechanism 21 to carry the finger 59 to a second position to prevent contact with the contactor, best shown in FIG. 7.

The lock assembly 22 includes levers 70, 72 and a rotatable member 74. The levers and member 74 are each rotatably mounted to permit movement independent of the other on a pin 75 fixedly secured to the wall 34. The rotatable member 74 is provided with outwardly extended spaced apart arms 76, 77 between which is positioned and embraced for movement therewith the finger 59. The rotatable member 74 is also provided with projections or lugs 78, 79 to be selectively contacted for movement by a respective lever 70, 72. The lug 78 extends beneath and across the bottom or underside of the lever 72 and the lug 79 extends over and across the top edge of the lever 70. Movement of either lever 70, 72 in a counterclockwise direction, or lock position, will effect engagement with a respective lug 78, 79 to lock the rotatable member 74 in movement to carry the finger 59 out of contact with the contactor 37. Resetting both levers 70, 72 to unlock position the member 40 is biased by a spring 73 to return to hold the finger in vertical latch contact position. The spring 73 is coiled about the axis of pin 75 with one end attached to the wall 34 and the other tensioned against the lug 79 of the rotatable member 40.

Springs 85, 86 are provided for levers 70, 72 respectively to maintain the levers in their alternate lock and unlock positions.

The lever 70 extends outwardly through a slot in the casing 30 and is interconnected by a connector 80 to the outside key operated lock 123. The key operated lock sequentially actuates the lever 70 between lock and unlock position. The lever 70 is also movable to lock position through a setting of the concealed lever 25. A resetting of the lever 25 to unlock position does not return the lever 70 to unlock the latch which must be effected through the key operated lock 25.

The lever 72 is operatively connected by a connector 69 to a manually operated control lever 71 which may be associated with the inside control assembly 22.

The lever 25 is pivotally mounted on a pin 92 affixed to a bracket 94 which is secured to the case 30 by screws, weld or the like. One end of the lever 25 projects through a slotted opening 95 formed in the end wall 31 of the door to which is affixed a handle 96. The opposite end of the lever is connected to one end of a rod 97 which is guided for axial movement by bracket 98 for the opposite end of the rod to frictionally engage to move the lever 70 into lock position.

An arm 100 is pivotally secured on the axis pin 92 of lever 25 and is operatively connected for limited movement with the lever 25. A pin 104 affixed to the arm 100 extends through an arcuate slot 105 formed in the lever 25. A cable 106, enclosed in a sheath 107, has one end connected to the pin 104 and the opposite end to a hood latching mechanism 27 with an intermediate point being connected to actuate the master switch 26 of the ignition system 28.

It is to be noted that the handle 96 of lever 25 on the end wall of the door when in open position is concealed to become inaccessible between wall 13 and pillar 16 upon closing of the door 12. The handle 96 functions upon being moved downwardly, lock position, to preset the locking of the latch by actuating the lever 70 upwardly, operates cable 106 to disable the ignition system by opening the master switch 27 and locks the hood latch. Key unlocking of the door moves lever 70 downwardly to unlock the latch and to axially move the rod 97 downwardly a sufficient distance to reset the lever 25 with the pin 104 against the top edge of the slot 105. The lever 25 is now readied and coupled with arm 100 to reversely operate the cable 106 but which can only be had by first opening the door for access to the handle 96 for manual operation. With the handle in down position the hood latch is unlocked and the master switch 26 closed to preset the ignition circuit for control by the key operated switch 29.

To protect the inaccessibility of the handle 96 it is necessary that this door be unlocked by key alone and that the inner door lock control 69 become inoperative to unlock the door and safeguard the vehicle against theft. To this end there is provided a mechanical arrangement 110 associated with the locking mechanism which prevents a subsequent presetting of the lock by the inside lock control after a presetting by handle 96 of lever 70 into lock and if the lever 72 was preset prior to use of handle 96 or key lock 23 the inside latch locking mechanism lever 72, is automatically actuated into unlock.

The mechanical arrangement 110 comprises a link 112 having one end pivotally connected to the lever 70 and its opposite end pivotally connected to one end of a lever 120. A stud 122 is fixedly secured on the opposite or distal end of the lever 120 fulcrummed on a pin 124. The stud is carried into abutment engagement against a leg 126 formed integrally with the lever 72. The lever 72 has a second integrally formed leg 127 adapted to abut against a stop 129 formed on the link 112.

In operation the door latch may be locked from the inside or the outside and preset into lock position by handle 96 while the door is open. In locking by handle 96 or key lock 23 the lever 70 is operated which through rotatable member 74 positions member 40 to set the finger 59 out of position to avoid contact with the contactor 37. The lever 70 also through link 112 positions lever 120 so that the stop 129 will be abutted by leg 127 to prevent travel of lever 72 from its unlock position should there be an attempt to use the inside lock control. The member 40 returned by spring 73 to reset finger 59 for contact by contactor 37 upon being freed from the lever 70 moved to unlock by key operation of lock 23.

For a further understanding of the lock operation assume that the inside lock control has preset the lever 72 in lock position as shown in FIG. 7 and thereafter the door is closed. The other controls 123 and 24 are set with lever 70 to unlock position. To reopen the door the outside key lock 23 is operated to lock position and then to unlock position. Moving into lock position the lever 70 through link 112 rocks the lever 120 so that the stud 122 abuts leg 127 to move the lever 72 into unlock position to release its holding engagement with the member 40 by separation from lug 78. The spring 73 thereafter resets the finger 59 to reconnect the latch for operation.

Having thus described the invention it will be apparent to those skilled in the art that various modifications and changes can be made without departing from the spirit of the invention or the scope of the appended claims.

I claim:

1. A locking arrangement for a vehicle door latch adapted to engage a pillar mounted striker, said latch including a pawl for movement with and by a contactor, manually operated means connected with to actuate said contactor, said locking arrangement comprising:
    a first member being operative alternately into a first position for interconnecting said pawl with and for movement by said contactor and in being displaced therefrom to a second position to prevent movement of said pawl by said contactor;
    a second member engaging said first member and being operative to move said first member into said alternative positions;
    a pair of levers pivotally mounted on a common axis and each lever being independently pivoted thereon;
    a first manually operated control means connected with for moving one of said levers and a second manually operated control means connected with for moving the other of said levers;
    said door having said first manually operated control means positioned on one side of said door and said second control means on the opposite side thereof;
    means for selectively interlocking said levers with said second member for movement therewith to position thereby said first member into second position;
    and movable means operably arranged for movement by one of said levers to engage to move said other lever to be disengaged and supplanted thereby in engagement with said second member.

2. The locking arrangement of claim 1, comprising;
    resilient means for biasing said second member to carry said first member into first position following the disengagement of both of said levers from said second member.

3. The locking arrangement of claim 2, comprising;
    said movable means having a stop positioned thereby for abutment by the lever actuated out of engagement from said second member to bar re-engagement therewith while the other lever is in engagement therewith.

4. The locking arrangement of claim 2, comprising;
    at least one of said manually operated controls being key operated and being operatively connected with the lever operable for actuating said movable means.

5. A locking arrangement for a vehicle door latch adapted to engage a pillar mounted striker, said latch including a pawl for movement with and by a contactor, manually operated means connected with to actuate said contactor, said locking arrangement, comprising;
    a first member being operative alternately into a first position for interconnecting said pawl with and for movement by said contactor and in being displaced therefrom to a second position preventing movement of said pawl by said contactor;
    a second member engaging said first member and being operative to move said first member into said alternate positions;
    a pair of levers pivotally mounted on a common axis and each lever being independently pivoted thereon;
    a first manually operated control means connected with for moving one of said levers and a second manually operated control means connected with for moving the other of said levers.
    said door having said first manually operated control means positioned on one side of said door and said second control means on the opposite side thereof;
    means arranged to respectively engage and disengage said second member with and from said levers, said means selectively interlocking said levers with said second member for uni-lateral movement therewith;
    and stop means carried by one of said levers and adapted to be positioned thereby for abutment engagement by the other lever to bar movement of the latter lever to engage said second member.

6. The locking arrangement of claim 5 and comprising;
    a spring biased to actuate said second member upon disengagement from said levers to set said first members in first position.

7. A locking arrangement for a vehicle having a door with an end wall, a pillar, means on said door comprising a spring biased rotor, a pawl, a contactor and each being pivotally journaled in a casing, said casing having an opening for entrance of said pillar mounted striker for engagement with said rotor engaged by said pawl, a movable member normally connecting said pawl in movement with said contactor to disengage said pawl from said rotor, and locking means for displacing said member in a disconnect position to avoid contact of said pawl by said contactor, comprising:
    a pair of levers pivotally journaled in co-axial relationship in said casing, each lever being separately and independently pivoted alternately to a lock and unlock position;

a rotatable member journaled in said casing co-axially with said levers and having means to selectively interlock in movement said member with either lever being selected for movement into lock position and be held thereby until said lever is returned to unlock position;

means interlocking in movement said member with said rotatable member and being arranged for displacing said member as said rotatable member is being held by one of said levers set in lock position;

manually operated control means operatively connected to for actuation of one of said levers into alternate positions and key operated control means operatively connected to for actuation of the other of said levers into alternate positions; and means connected with and being operative by said key operated lever in moving into engagement with said rotatable member to release the engagement of said outer lever therefrom.

8. The locking arrangement of claim 7 and comprising;

said means associated with said rotatable member being a first and second lug projection extending from said member for abutment engagement each by a respective lever while moving into and being held in lock position; and spring means to bias said rotatable member freed from engagement with said levers to reset said member into first position.

9. The locking arrangement of claim 8 and comprising; said last mentioned means including a lever fulcrummed in said casing, said lever being operatively connected for actuation by said key operated lever and having a distal end adapted to engage to move said other lever from lock to unlock position.

10. The locking arrangement of claim 7 and comprising;

a third control means being manually operated and connected to preset said key operated lever into lock position having a lever pivotally journaled to said casing, a handle therefor and a rod operatively connected to said lever to extend therefrom towards for abutment against said key operated lever when in unlock position; and said handle being adjacent an end wall of said door, said end wall being arranged upon closure of said door to cooperatively form with said pillar an enclosure to conceal and make inaccessible therein said handle.

11. The locking arrangement of claim 10 and comprising:

said vehicle having a hood locking mechanism operable alternately into lock and unlock position;

cable means operatively interconnecting said hood latching mechanism with the lower of said third control means and being arranged to effect a locking of said hood latching mechanism with the setting of said key operated lever to lock; and means interconnecting said cable and lever to permit limited movement of the latter without actuation of the former until operated by said handle.

12. The locking arrangement of claim 10 and comprising:

said vehicle having an ignition circuit and a master switch connected therein, said switch being operable to open and close said circuit, cable means operatively interconnecting said master switch with the lever of said third control means and being arranged to effect an opening of said switch with the setting of said key operated lever to lock; and means interconnecting said cable and lever to permit limited movement by the latter without actuation of the former until operated by said handle.

13. The locking arrangement of claim 12 and comprising:

said vehicle having a hood locking mechanism operable alternately into lock and unlock position, said hood locking mechanism being connected to for actuation by said cable into lock position simultaneously with said master switch being actuated into open position.

14. The locking arrangement of claim 12 wherein said last mentioned means includes an arm pivotally journaled with said lever for independent co-axial movement therewith, a slot in said lever, a pin affixed to and extended from said arm into and for movement in said slot, and said cable being affixed to said pin for movement therewith.

15. A locking arrangement for a vehicle having a swingably mounted door closable to a pillar, said door and pillar each being formed to cooperatively form a sealed spatial area therebetween, said vehicle having a hood latching arrangement, an ignition system and a door latch carried on said door to engage a striker mounted on said pillar, said door latch including a rotor for engaging, disengaging said striker, a pawl for said rotor and manually actuated latch control means including a contactor for effecting movement of said pawl away from said rotor, movable means movable into position to interconnect and into position to disconnect said pawl for movement by said contactor, and said locking means comprising:

a first and a second lever each being pivotally mounted in said door;

means operably interconnecting said movable means selectively with said levers upon movement of either of said lever in a respective first direction and disconnecting said movable means therefrom upon either lever moving in a direction opposite the first direction;

manually actuated lock control means being operably connected to a respective lever for operating the respective lever into its alternate positions and one of said control means being key operated;

a manually operated lever pivotally mounted on that portion of said door to be sealed by said pillar to make inaccessible said lever upon closure of said door and said lever being accessible upon said door being held open;

a master switch for said ignition system operable alternately to open and closed position;

cable means operably interconnecting said manually operated lever with said master switch and said hood latching arrangement;

means extending from said manually operated lever towards and into engagement with said first lever for actuation therewith to move the said lever in a first direction and be disengaged therefrom upon said manually operated lever being moved in a reverse direction;

means operably connecting said first lever with said key operated lock control means for actuation of said lever to said alternate positions; and engaging means operable by said first lever moving into said first position to engage and displace therefrom said second lever.

References Cited

UNITED STATES PATENTS 3,365,226   1/1968   Shay _____ 292—216

FOREIGN PATENTS 970,538   9/1964   Great Britain.

MARVIN A. CHAMPION, Primary Examiner

A. G. CRAIG, JR., Assistant Examiner

U.S. Cl. X.R.

70—264; 292—11, 216